United States Patent
Xu et al.

(10) Patent No.: US 12,418,810 B2
(45) Date of Patent: Sep. 16, 2025

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventors: Jin Xu, Beijing (CN); Wenjing Ren, Beijing (CN); Ying Zhou, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 334 days.

(21) Appl. No.: 17/766,530

(22) PCT Filed: Nov. 3, 2020

(86) PCT No.: PCT/CN2020/126011
§ 371 (c)(1),
(2) Date: Apr. 5, 2022

(87) PCT Pub. No.: WO2021/088776
PCT Pub. Date: May 14, 2021

(65) Prior Publication Data
US 2024/0056840 A1    Feb. 15, 2024

(30) Foreign Application Priority Data
Nov. 8, 2019   (CN) .......................... 201911088211.4

(51) Int. Cl.
*H04W 16/14*    (2009.01)
*H04B 7/06*    (2006.01)
(Continued)

(52) U.S. Cl.
CPC ........ *H04W 24/04* (2013.01); *H04B 7/06964* (2023.05); *H04W 16/14* (2013.01); *H04W 74/0808* (2013.01)

(58) Field of Classification Search
CPC .. H04L 27/0006; H04L 5/0094; H04W 24/04; H04W 16/14; H04W 74/0808; H04B 7/088; H04B 7/0695
See application file for complete search history.

(56) References Cited

U.S. PATENT DOCUMENTS

| 2019/0053314 A1 | 2/2019 | Zhou |
| 2019/0132882 A1* | 5/2019 | Li ........................ H04L 27/2605 |
| 2021/0234601 A1* | 7/2021 | Awadin ................ H04L 5/0048 |

FOREIGN PATENT DOCUMENTS

| CN | 104717687 A | 6/2015 |
| CN | 105101446 A | 11/2015 |

(Continued)

OTHER PUBLICATIONS

International Search Report and Written Opinion mailed on Feb. 3, 2021, received for PCT Application PCT/CN2020/126011, Filed on Nov. 3, 2020, 10 pages including English Translation.

(Continued)

*Primary Examiner* — Anez C Ebrahim
(74) *Attorney, Agent, or Firm* — XSENSUS LLP

(57) ABSTRACT

The present disclosure provides an electronic device and a method for wireless communication, and a computer readable storage medium. The electronic device comprises: a processing circuit configured to determine that a beam failure event occurs on a downlink of an unlicensed band, and to execute, on the unlicensed band and in a beam failure recovery process for the beam failure event, delay reduced clear channel assessment-based uplink transmission.

20 Claims, 11 Drawing Sheets

(51) Int. Cl.
*H04W 24/04* (2009.01)
*H04W 74/0808* (2024.01)

(56) References Cited

FOREIGN PATENT DOCUMENTS

| | | |
|---|---|---|
| CN | 106341902 A | 1/2017 |
| CN | 108495367 A | 9/2018 |
| CN | 110063083 A | 7/2019 |
| CN | 110138530 A | 8/2019 |
| CN | 110167143 A | 8/2019 |
| KR | 20170093059 A | 8/2017 |
| WO | WO-2017105306 A1 | 6/2017 |
| WO | 2017/117424 A1 | 7/2017 |
| WO | WO-2019037568 A1 | 2/2019 |
| WO | WO-2019154387 A1 | 8/2019 |
| WO | WO-2019195465 A1 | 10/2019 |

OTHER PUBLICATIONS

CMCC, "BWP and sub-band switching for NR-U in RACH", 3GPP TSG-RAN WG2 Meeting #107bis, R2-1912936, Oct. 14-18, 2019, 3 pages.
LG Electronics, "DL LBT operation with variable contention window size", 3GPP TSG RAN WG1 meeting #81, R1-152732, May 25-29, 2015, 6 pages.
Vivo: "LBT impacts on BFD in NR-U",3GPP Draft; R2-1818267 LBT Impacts on BFDIN NR-U, 3rd Generation Partnershipproject (3GPP), MOBILECOMPETENCE CENTRE650, Route Des Lucioles; F-06921Sophia-Antipolis Cedex; France.
Nokia, Bell, "Feature Lead's Summary on Channel Access Procedures", 3GPP TSG RAN WG1 Meeting #96, R1-1903499, tsg_ran\wg1_rl1, Feb. 28, 2019.
Mediatek Inc: "Discussion on Channel Access Procedure", 3GPP Draft; R1-1906543_FR vol. RAN WG1, No. Reno, USA; May 13, 2019-May 17, 2019 May 13, 2019 (May 13, 2019), XP051727994.

* cited by examiner

| LBT Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

| LBT access priority class | $m_p$ | $CW_{min,p}$ | $CW_{max,p}$ | $T_{mcot,p}$ | Allowed $CW_p$ Sizes |
|---|---|---|---|---|---|
| 1 | 2 | 3 | 7 | 2ms | {3,7} |
| 2 | 2 | 7 | 15 | 4ms | {7,15} |
| 3 | 3 | 15 | 1023 | 6ms or 10ms | {15,31,63,127,255,511,1023} |
| 4 | 7 | 15 | 1023 | 6ms or 10ms | {15,31,63,127,255,511,1023} |

ELECTRONIC DEVICE AND METHOD FOR WIRELESS COMMUNICATION, AND COMPUTER READABLE STORAGE MEDIUM

CROSS-REFERENCE TO RELATED APPLICATIONS

The present application is based on PCT filing PCT/CN2020/126011, filed Nov. 3, 2020, which claims priority to Chinese Patent Application No. 201911088211.4, titled "ELECTRONIC DEVICE AND METHOD FOR WIRELESS COMMUNICATION, AND COMPUTER READABLE STORAGE MEDIUM", filed on Nov. 8, 2019 with the China National Intellectual Property Administration (CNIPA), the entire contents of each are incorporated herein by reference in its entirety.

FIELD

The present disclosure relates to the technical field of wireless communications, and in particular to beam failure recovery technology on an unlicensed frequency band. More particularly, the present disclosure relates to an electronic apparatus and a method for wireless communications and a computer-readable storage medium.

BACKGROUND

As a next generation wireless access manner for long term evolution (LTE), new radio (NR) is a radio access technology (RAT) different from LTE. Multiple in multiple output (MIMO) technology may also be used in NR. In NR MIMO, beam management is very important for ensuring communication quality. For example, in a case that quality of a beam serving user equipment (UE) drops down to a certain extent, the beam becomes unavailable, and it is considered that a beam failure occurs. In this case, a beam failure recovery (BFR) mechanism is required to reallocate a new beam for data transmission of the user equipment.

In addition, on an unlicensed frequency band, the user equipment is required to perform channel idle detection such as a listen before talk (LBT) mechanism on a channel to determine that the channel is in an idle state before accessing into the channel, so as to ensure that the user equipment would not conflict with other user equipment after accessing into the channel. A new radio system on an unlicensed frequency band (NR-U) may further use carrier aggregation (CA) technology.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry. The processing circuitry is configured to: determine that a beam failure event of downlink on an unlicensed frequency band occurs; and in beam failure recovery processing with respect to the beam failure event, perform uplink transmission based on channel idle detection with reduced latency on the unlicensed frequency band.

A method for wireless communications is provided according to an aspect of the present disclosure. The method includes: determining that a beam failure event of downlink on an unlicensed frequency band occurs; and in beam failure recovery processing with respect to the beam failure event, performing uplink transmission based on channel idle detection with reduced latency on the unlicensed frequency band.

An electronic apparatus for wireless communications is provided according to another aspect of the present disclosure. The electronic apparatus includes processing circuitry. The processing circuitry is configured to: determine setting of channel idle detection with reduced latency for uplink transmission to be performed on an unlicensed frequency band by user equipment in beam failure recovery processing with respect to a beam failure event of downlink on the unlicensed frequency band; and provide the setting to the user equipment.

A method for wireless communications is provided according to another aspect of the present disclosure. The method includes: determining setting of channel idle detection with reduced latency for uplink transmission to be performed on an unlicensed frequency band by user equipment in beam failure recovery processing with respect to a beam failure event of downlink on the unlicensed frequency band; and providing the setting to the user equipment.

With the electronic apparatus and the method according to the present disclosure, the latency of the beam failure recovery on the unlicensed frequency band can be effectively reduced, by reducing the latency of channel idle detection on the unlicensed frequency band.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As described above, it is required to perform channel idle detection such as an LBT mechanism first for transmission on an unlicensed frequency band, which results in an additional latency, so that a latency of a BFR procedure is increased. In an NR-U system adopting CA, a probability of performing BFR is further increased. For example, for a secondary cell (scell) without an uplink (UL), the BFR may be performed by a primary cell (pcell). For a scell with an UL, the BFR may be performed by the scell itself. When a beam failure occurs in a downlink (DL) of the unlicensed frequency band, the BFR in the above mentioned both cases incur a large latency. Technology for reducing the latency is provided according to this embodiment.

Figure 1:
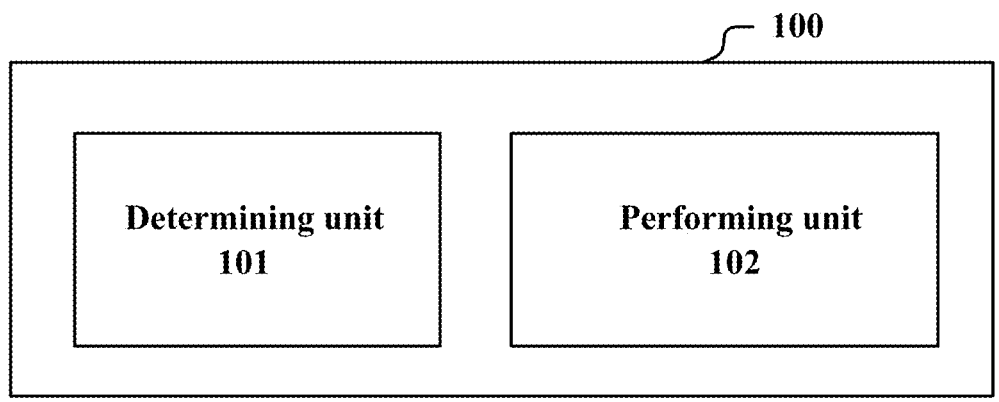
FIG. 1 is a block diagram showing functional modules of an electronic apparatus for wireless communications according to an embodiment of the present disclosure.

FIG. 1 is a block diagram showing functional modules of the electronic apparatus 100 for wireless communications according to an embodiment of the present disclosure. As shown in FIG. 1, the electronic apparatus 100 includes a determining unit 101 and a performing unit 102. The determining unit 101 is configured to determine that a beam failure event of a downlink on an unlicensed frequency band occurs. The performing unit 102 is configured to, in beam failure recovery processing with respect to the beam failure event, perform uplink transmission based on channel idle detection with reduced latency on the unlicensed frequency band.

The determining unit 101 and the performing unit 102 may be implemented by one or more processing circuitries. The processing circuitry may be implemented as, for example, a chip. In addition, it should be understood that various functional units in the apparatus shown in FIG. 1 are logical modules divided based on functions implemented by these functional units, and are not intended to limit specific implementations.

The electronic apparatus 100 may be arranged at a side of the user equipment (UE) or may be communicatively connected to the UE. Here it should be pointed out that the electronic apparatus 100 may be implemented at a chip level or an apparatus level. For example, the electronic apparatus 100 may serve as the user equipment itself and further include external apparatuses such as a memory and a transceiver (which are not shown in the drawings). The memory may be configured to store programs to be executed and related data information for the user equipment to implement various functions. The transceiver may include one or more communication interfaces to support communications with different apparatuses (for example, a base station, other user equipment and the like). Implementations of the transceiver are not limited herein, which is also applicable to examples of other configuration examples of the electronic apparatus at the UE side described subsequently.

Figure 2:
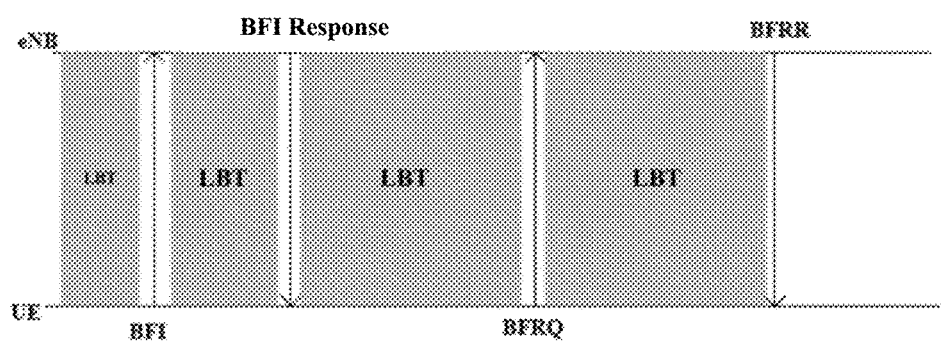
FIG. 2 is a schematic diagram showing signaling interaction in a BFR procedure.

For the downlink of the unlicensed frequency band, the determining unit 101, for example, detects beam quality of a current serving beam, to determine whether the beam quality meets a trigger condition of a beam failure event, and determine that a beam failure event occurs in s case of determining that the beam quality meets the trigger condition. Subsequently, signaling related to BFR is transmitted between the UE and the base station (for example, an eNB), as shown in FIG. 2. First, the UE transmits a beam failure indication (BFI) to the base station to report occurrence of the beam failure event. After receiving the BFI, the base station transmits to the UE a BFI response such as an uplink grant (UL grant) for the UE. After receiving the BFI response, the UE transmits a beam failure recovery request (BFRQ) to the base station. The BFRQ may include, for example, information for identifying the UE and information of a candidate beam serving as a beam switching object. Next, the UE monitors the response to the BFRQ from the base station, that is, a beam failure recovery request response (BFRR) within a specific time window, and the BFR is completed. The uplink transmission in FIG. 2, such as BFI transmission and BFRQ transmission is performed on the unlicensed frequency band, and thus channel idle detection such as the LBT is required to be performed before transmission to detect whether the current channel is occupied by other UE. In addition, only in a case of detecting that the channel is idle, the UE can perform the corresponding uplink transmission. There is a similar situation for the downlink transmission of the base station.

It can be seen that compared with the BFR on a licensed frequency band, in the BFR on the unlicensed frequency band, channel idle detection is required to be performed before transmission of a signaling to the base station, so that a latency of uplink transmission is increased, thereby further increasing the latency of the BFR procedure. In this embodiment, the latency of the channel idle detection is reduced to reduce the latency of the BFR procedure. It should be noted that LBT is taken as an example of the channel idle detection in the following description, which is not restrictive.

In an example, the performing unit 102 is configured to perform uplink transmission without the channel idle detection by sharing channel occupancy time (COT) of downlink transmission of a base station previous to the uplink transmission. In other words, the UE can share the COT of the downlink transmission of the base station. For example, referring to FIG. 2, the uplink transmission may be transmission of BFRQ to the base station, and the downlink transmission of the base station may be transmission of a BFI response to the UE.

Figures 3, 4, 5:
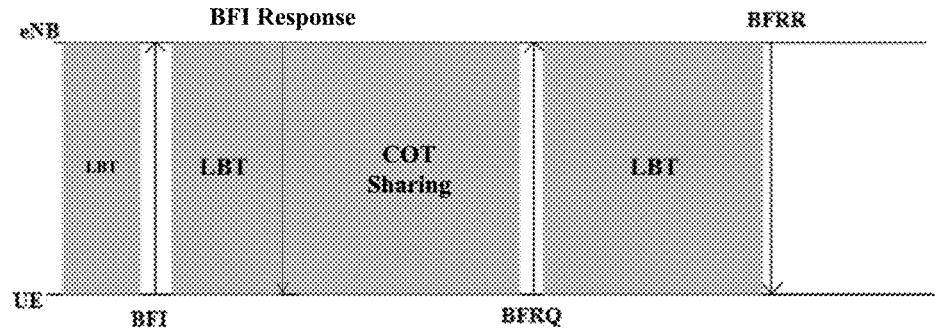
FIG. 3 shows a schematic example of UE sharing a COT of downlink transmission of a base station.
FIG. 4 shows an example of a downlink LBT access priority class.
FIG. 5 shows an example of an uplink LBT access priority class.

In this example, the UE is not required to perform channel idle detection when transmitting the BFRQ, but shares the COT with which the base station transmitting the BFI response, as shown in FIG. 3. LBT is not performed before transmitting the BFRQ.

A length of COT that can be shared depends on the LBT accessing priority class of the base station. FIG. 4 shows an example of a downlink LBT access priority class, and FIG. 5 shows an example of an uplink LBT access priority class. $T_{mcot,\ p}$ represents a longest time period when a frequency band may be occupied after one LBT is performed. It can be seen that in a case that the LBT access priority class is higher, a size of an allowed contention window $CW_p$ is smaller, that is, a time period cost by the LBT is shorter, so that the base station or the UE can access the channel faster. However, in this case, a length of the COT is smaller.

The access priority class of the LBT performed by the UE may be determined by the base station or be selected autonomously. A BFI signaling is carried on a physical uplink control channel (PUCCH) and the PUCCH usually has a high priority class, so that the LBT access priority class of the BFI signaling is usually high, for example, the priority class 1 as shown in FIG. 4. Therefore, the UE can inform the base station of the occurrence of the beam failure as soon as possible.

Exemplarily, the LBT priority class of the BFI response may be one of priority class 2 to priority class 4. In this way, on the one hand, duration of the LBT to be performed for accessing into the channel is considered. On the other hand, the COT after successful access is considered, so that the latency of the BFR procedure can be reduced in a case that the UE shares the COT of the BFI response.

After the BFRQ from the UE is received, if a candidate beam reported by the user is available, the base station is expected to reply BFRR to the UE as soon as possible. Therefore, an LBT with a high access priority class, such as the LBT with the priority class 1, may be selected.

It should be noted that the above selection of LBT access priority class is exemplary rather than restrictive.

Figure 6:
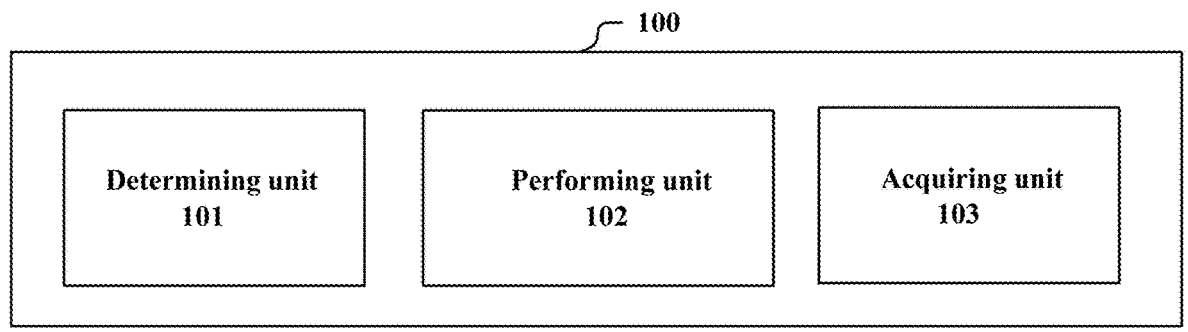
FIG. 6 is a block diagram showing functional modules of an electronic apparatus for wireless communications according to an embodiment of the present disclosure.

In addition, the UE may further acquire, from the base station, an indication of the length of the COT of downlink transmission that can be shared. In an example, the UE acquires the indication through a radio resource control (RRC) signaling. The indication may include, for example, information of the length of the COT or information of the downlink LBT access priority class. The UE determines the length of the COT that can be shared based on the information of the priority class. Accordingly, as shown in FIG. 6, the electronic apparatus 100 may further include an acquiring unit 103. The acquiring unit 103 is configured to acquire the indication from the base station.

The electronic apparatus 100 according to this embodiment can reduce the latency of the BFR of the downlink on the unlicensed frequency band, by sharing the COT of the downlink transmission of the base station without the need of performing the LBT for the uplink transmission.

Second Embodiment

In this embodiment, the performing unit 102 may be configured to perform uplink transmission based on the channel idle detection with reduced latency by dynamically reducing duration of the channel idle detection. For example, in a case that the channel idle detection is LBT, the performing unit 102 may dynamically determine a size of a contention window.

Figure 7:
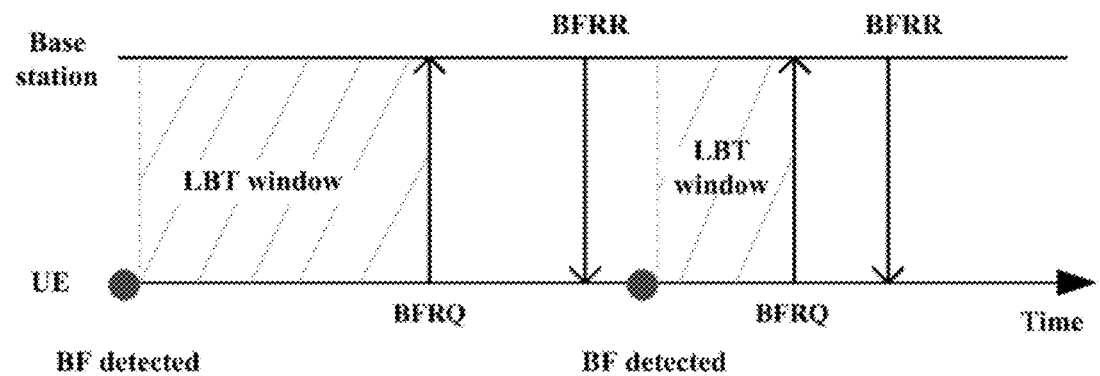
FIG. 7 shows a schematic example of dynamically reducing a listening window of LBT.

In other words, the performing unit 102 may dynamically reduce the size of the contention window of the LBT, thereby reducing the latency caused by the LBT. The size of the contention window determines a size of a monitoring window of the LBT. FIG. 7 shows a schematic example of dynamically reducing the monitoring window of the LBT. In FIG. 7, the uplink transmitted BFRQ is taken as an example, which is not restrictive.

Exemplarily, the size of the contention window of the LBT may be defined by the parameter $CW_p$ shown in FIG. 5. In Cat-4 LBT, initial clear channel assessment (ICCA) is performed first. If the channel is not detected to be occupied during the ICCA stage, the LBT ends and data is directly transmitted. Otherwise, an extended clear channel assessment (ECCA) backoff stage is entered. In this stage, a counter with an initial number of N is set, and CCA within a predetermined duration is performed after backoff of a certain time period. If the channel is detected to be idle according to the CCA, the number of the counter is reduced by 1 until the number of the counter is equal to 0. When the number of the counter is equal to 0, the LBT ends and data transmission may be performed. N is a random number evenly distributed between 0 and $CW_p$. Therefore, the value of $CW_p$ determines the size of the contention window of the LBT, and the performing unit 102 may change the size of the contention window of the LBT by dynamically changing the value of $CW_p$.

The performing unit 102 may dynamically determine the size of the contention window of the LBT in various ways. In an example, the base station may configure multiple sizes of the contention window for the UE through an RRC signaling. For example, the base station configures an array including multiple optional values of $CW_p$. The UE may select a value of $CW_p$ from the array according to a predetermined rule, and determine the size of the contention window of the LBT, for example, the value of N described above, based on the selected value of $CW_p$.

Exemplarily, the values in the array are in a decreasing order, and the performing unit 102 is configured to determine, by taking the number of times of occurrence of the beam failure event as a sequence number, a corresponding value from the array serving as candidates of the size of the contention window of the LBT as the size of the contention window of the LBT. For example, when the beam failure occurs for the first time, the first value is used. When the beam failure occurs for the second time, the second value is used, and so on. This method is referred to as an enumeration method in the following.

Figure 8:
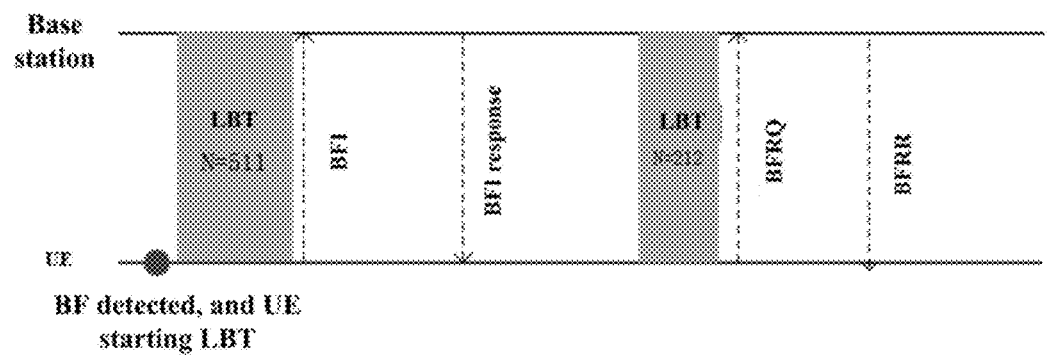
FIG. 8 shows a schematic example of a size of a contention window of LBT.
Figure 9:
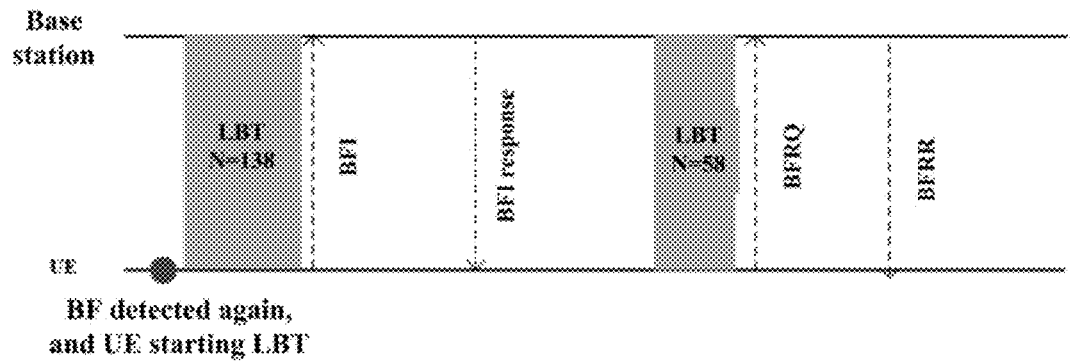
FIG. 9 shows an example of BFR when a beam failure occurs again.

FIG. 8 shows a schematic example of the size of the contention window. It is assumed that the $CW_p$ array configured by the base station for the UE is, for example, $CW_p$=[511, 255, 63, 31, 15]. FIG. 8 shows a BFR procedure when a beam failure occurs for the first time. In this case, a time period required to be waited when uplink transmission is performed is $N*T_d$ ($T_d$ represents a delay period), where N is a random number within an interval (0, 511]. In the example shown in FIG. 8, N is equal to 511 and 212 respectively. In a case that the beam failure occurs again and the beam idle degree meets a predetermined condition, the value of N is within a range of (0, 212], and so on. FIG. 9 shows an example of BFR in a case that the beam failure occurs again, where N is equal to 138 and 58 respectively. It can be seen that the latency of LBT is reduced compared with that in the case that the beam failure occurs for the first time.

In another example, the base station only configures an initial size of the contention window for the UE. The performing unit 102 attenuates the initial value of the size of the contention window of the LBT with a predetermined rule based on the number of times of occurrence of the beam failure event, to determine the size of the contention window of the LBT. The predetermined rule may be default or indicated by the base station through an RRC signaling. The predetermined rule includes, for example, a rule indicating how to attenuate. The attenuating may include, for example, exponential attenuating or multiple attenuating. In a case that the attenuating includes the exponential attenuating, the predetermined rule, for example, may indicate a form of a corresponding exponential function, such as a base of the exponential function. In a case that the attenuating includes the multiple attenuating, the predetermined rule includes, for example, a specific multiple value p, where p is a natural number greater than 1. This method is referred to as a rule method in the following.

Still taking FIG. 8 as an example, in a case that the multiple attenuating is applied to $CW_p$, if an initial $CW_p$ is equal to 511, the value of N is changed to be within (0, 511/p] when the beam failure occurs again, and so on. That is, a current $CW_p$ is equal to 1/p of the $CW_p$ of LBT in a previous beam failure.

It should be understood that the method for dynamically reducing the size of the contention window of the LBT is not limited to the above examples.

In the above examples, it is described that the performing unit 102 dynamically reduces the size of the contention window of the LBT based on the number of times of occurrence of beam failure events. In a case that the beam failure events occur for multiple times, the size of the contention window of the LBT may be appropriately reduced to recover the beam failure quickly, so as to improve user experience.

In addition, the performing unit 102 may further determine the size of the contention window of the LBT based on historical conditions of the channel idle detection. For example, in a case of inferring that the channel is idle and a probability of successful access into the channel is high based on the historical conditions of the channel idle detection, the contention window of the LBT may be appropriately reduced to avoid unnecessary waiting, so as to reduce the latency. For example, when a beam failure event occurs again, the performing unit 102 may change the size of the contention window of the LBT for uplink transmission to 1/p of the contention window of the LBT for uplink transmission at the time of a previous beam failure, where p is a natural number greater than 1 and is determined based on the historical conditions of the channel idle detection. For example, a higher channel idle degree corresponds to a larger p. A rule for determining the value of p, for example, may be configured by the base station.

Further, the performing unit 102 may further be configured to determine, in a case of determining that a historical idle degree of the channel meets a predetermined condition based on the historical conditions of the channel idle detection, the size of the contention window of the LBT based on the number of times of occurrence of the beam failure event. For example, in a case that the historical idle degree of the channel meets the predetermined condition, for example, in a case that the historical idle degree reaches or exceeds a predetermined degree, the performing unit 102 determines the size of the contention window of the LBT based on how many times beam failures occur before the current beam failure.

Exemplarily, the performing unit 102 may set a counter to count the number of times of occurrence of the beam failure events in a time period, so as to determine how many times beam failures occur before the current beam failure.

In addition, a memory may be set to store and update results of multiple clear channel assessments (CCA) performed in the past, and the stored results serve as data for reflecting the historical conditions of the channel idle detection. In this case, the performing unit 102 may, for example, determine the historical idle degree of the channel based on a ratio of the number of CCAs whose result indicating passing among L times of CCAs performed in the past. A result of CCA indicating passing means that the channel is idle. Therefore, a larger ratio indicates a higher historical idle degree. The performing unit 102 may be configured to determine that the historical idle degree of the channel meets the predetermined condition in a case that the ratio calculated above exceeds a predetermined threshold. A value of L and the predetermined threshold may be configured by the base station.

Figure 10:
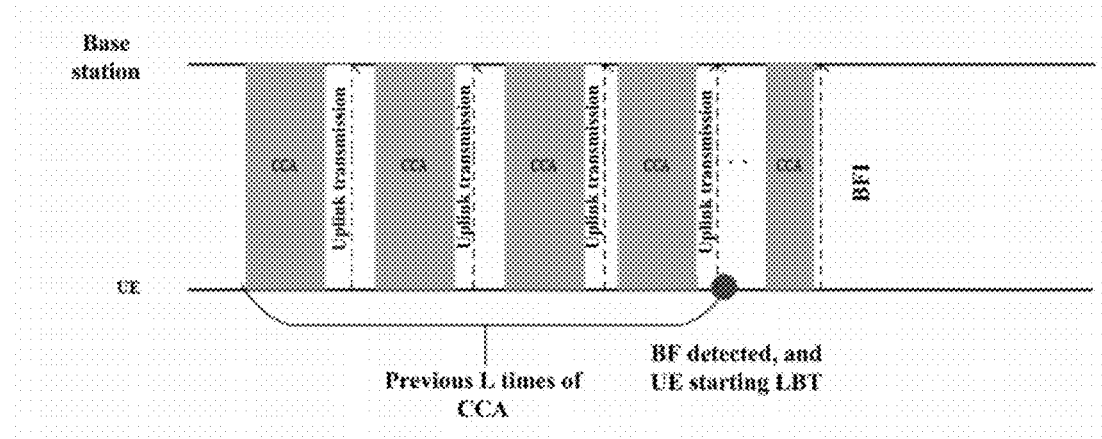
FIG. 10 shows a schematic example of previous L times of clear channel assessment.

The L CCAs may be CCAs performed by the UE when the UE performs the previous uplink transmission before a time node of transmitting the BFI, as shown in FIG. 10. It should be noted that in a case of adopting the Cat-4 LBT, the CCA described herein may include only the CCA in the ICCA stage described above, or include the CCA in the ICCA stage and the CCA in the ECCA stage. If the CCA described herein includes only the CCA in the ICCA stage, L herein further represents L times of uplink transmissions, otherwise one uplink transmission corresponds to results of multiple CCAs.

The value of L, for example, may be set by the base station through an RRC signaling. And the value is determined on a premise not causing too much burden on the user. For example, in a case that the number of results of stored CCAs exceeds L, the earliest results of CCAs are discarded sequentially.

In addition, in order to cause the results of L times of CCAs to be more referable, a time range of the results of CCAs may be limited. For example, the performing unit 102 is configured to use a result of a CCA within a predetermined reference time range from the current time instant. If the occurrence time instants of some of the L times of CCAs are beyond the predetermined reference range, the results of these CCAs are not taken into account.

Figure 11:
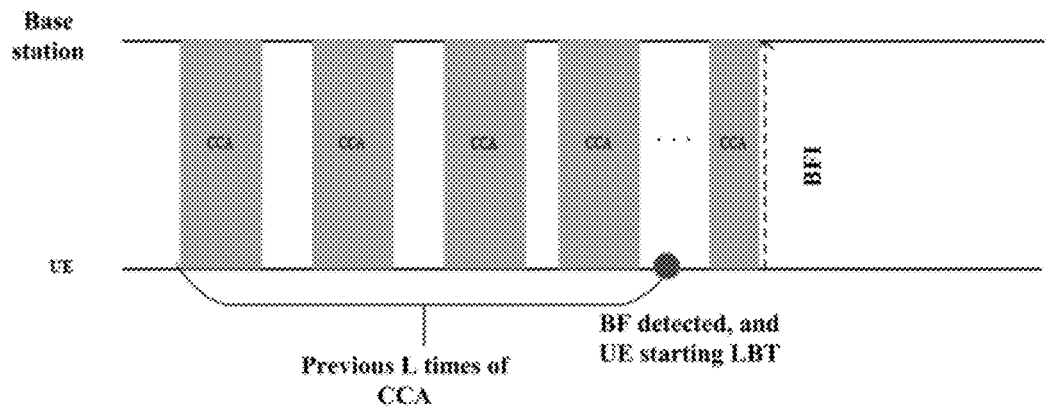
FIG. 11 shows a schematic example of UE periodically performing CCA and acquiring a result of the CCA.

In addition, in addition to making use of the results of CCAs of the previous uplink transmissions, the UE may periodically perform CCA and acquires a result of the CCA, as shown in FIG. 11. In this way, the UE may calculate the ratio by querying the recorded results of the periodic CCAs.

Figure 12:
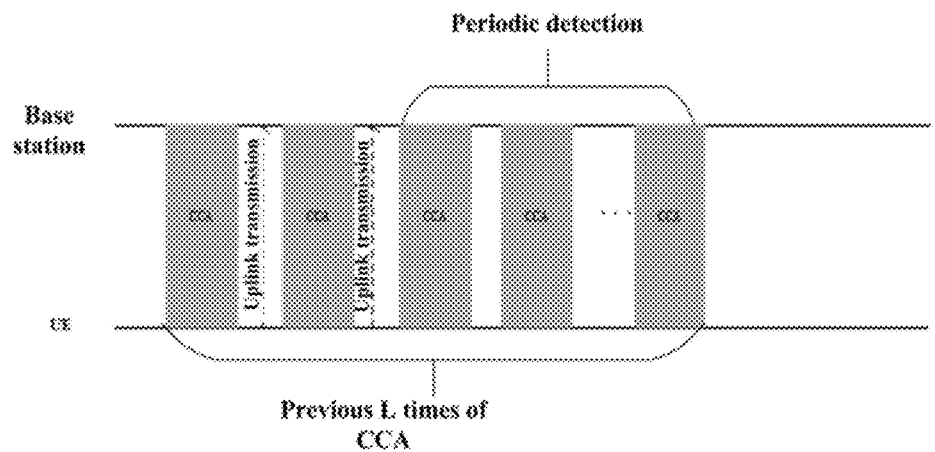
FIG. 12 shows an example of combination.

It should be noted that the way of making use of the results of CCAs of the previous uplink transmissions may be combined with the way of periodically performing CCA and recording results of the CCA. For example, in various cases such as a case that a beam failure occurs before the UE completes L periodic CCAs, or a case that there are not enough results of CCAs of previous uplink transmissions when a beam failure occurs, the way of combining provides more accurate reference. FIG. 12 shows an example of the way of combining, in which a former part of CCA results are results of CCAs of the previous uplink transmissions, and a latter part of CCA results are results of CCAs performed periodically.

In the way of combining, it is also required to discard results of the earliest CCAs to maintain L recorded results. The discarded results of CCAs may be results of the CCAs of the previous uplink transmissions or results of the CCAs periodically performed. In addition, the time of the recorded results of the CCAs may also be maintained within a predetermined reference time range from the current time instant.

In addition, the performing unit 102 may further be configured to determine the historical idle degree of the channel based on an average of numbers of times of CCAs performed in the previous L uplink transmissions, and determine that the historical idle degree of the channel meets the predetermined condition in a case that the average is less than a predetermined number of times. In the case of adopting the Cat-4 LBT, if the ICCA indicates that the channel is occupied, the ECCA stage is entered, in which the number of times of performed CCAs depends on a busy degree of the channel. In a case that the channel is busy, it is required to back off for a long time period, so as to perform more number of times of CCAs. Therefore, in a case that the average of numbers of times of CCAs performed in the previous L times of uplink transmissions is greater than the predetermined number, it indicates that the channel is busy and it is not suitable to reduce the contention window of the LBT.

The L times of uplink transmissions may be uplink signaling transmissions previously performed by the UE, LBTs (which may be regarded as virtual uplink transmissions) periodically performed by the UE for the purpose of detection, or a combination thereof, as described above. The value of L and the above predetermined number may be configured by the base station through an RRC signaling.

Referring to FIG. 6, the acquiring unit 103 may be configured to acquire an indication for determining the size of the contention window of the LBT from the base station via an RRC signaling. The indication may include, for example, one or more of: an array serving as candidates of the size of the contention window of the LBT; a method for reducing the size of the contention window of the LBT and related parameters; a parameter for determining whether to reduce the size of the contention window of the LBT; and whether to dynamically reduce the size of the contention window of LBT.

Exemplarily, in a case that the indication includes to dynamically reduce the size of the contention window of LBT, if the indication does not include other parameters, the UE dynamically reduces the size of the contention window of LBT based on default setting. In a case that the indication includes not to dynamically reduce the size of the contention window of the LBT, the UE does not perform relevant determination and operation of dynamically reducing the size of the contention window of the LBT. In addition, it may be set that in a case of no indication of whether to dynamically reduce the size of the contention window of the LBT, the UE dynamically reduces the size of the contention window of the LBT by default based on the default setting, that is, unless prohibited by the base station, the UE autonomously and dynamically reduces the size of the contention window of the LBT.

For example, the array serving as candidates of the size of the contention window of the LBT may be an array including candidates of the value of $CW_p$. The parameter is applicable to the enumeration method for reducing the size of the contention window of the LBT. The method for reducing the size of the contention window of the LBT is, for example, one of the enumeration method and the rule method. In a case of the rule method, the indication further includes a rule to be used and related parameters, for example, the multiple attenuating and the multiple value p described above. Parameters for determining whether to reduce the size of the contention window of the LBT include, for example, various thresholds for evaluating the historical idle degree of the channel, results of historical CCAs or the number of historical uplink transmissions as a reference described above.

The electronic apparatus 100 according to this embodiment reduces the latency of the BFR of the downlink on the unlicensed frequency band, by dynamically reducing the size of the contention window of the LBT to reduce the latency of the LBT.

In addition, the electronic apparatus according to the first embodiment and the electronic apparatus according to the second embodiment may be used in combination, that is, the latency of the BFR of the downlink on the unlicensed frequency band may be reduced by both sharing the COT of the downlink transmission of the base station and dynamically reducing the size of the contention window of the LBT.

Third Embodiment

Figure 13:
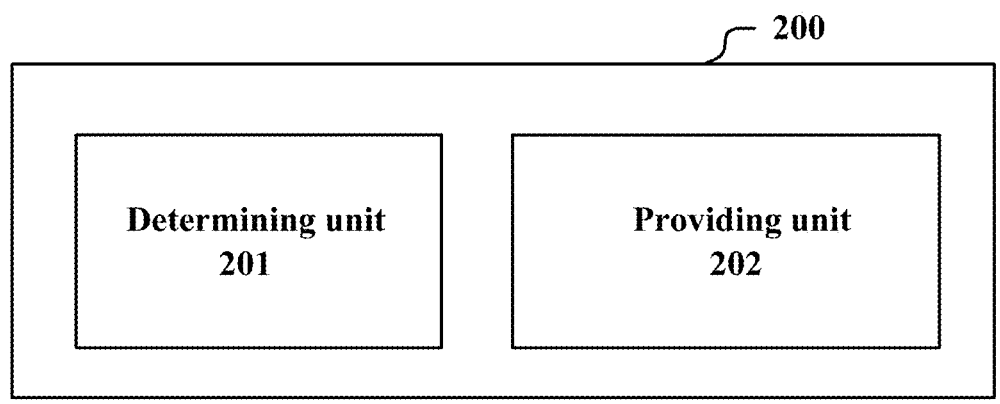
FIG. 13 is a block diagram showing functional modules of an electronic apparatus for wireless communications according to another embodiment of the present disclosure.

FIG. 13 is a block diagram showing functional modules of the electronic apparatus 200 for wireless communications according to another embodiment of the present disclosure. As shown in FIG. 13, the electronic apparatus 200 includes a determining unit 201 and a providing unit 202. The determining unit 201 is configured to determine setting of channel idle detection with reduced latency for uplink transmission to be performed on an unlicensed frequency band by UE in BFR processing with respect to a beam failure event of downlink on the unlicensed frequency band. The providing unit 202 is configured to provide the setting to the UE.

The determining unit 201 and the providing unit 202 may be implemented by one or more processing circuitries. The processing circuitry may be implemented as, for example, a chip. In addition, it should be understood that various functional units in the apparatus shown in FIG. 13 are logical modules divided based on functions implemented by these functional units, and are not intended to limit implementations.

The electronic apparatus 200 may be arranged at a side of a base station or may be communicatively connected to the base station. Here it should be pointed out that the electronic apparatus 200 may be implemented at a chip level or an apparatus level. For example, the electronic apparatus 200 may serve as the base station itself and further include external apparatuses such as a memory and a transceiver (which are not shown in the drawings). The memory may be configured to store programs to be executed and related data information for the base station to implement various functions. The transceiver may include one or more communication interfaces to support communications with different apparatuses (for example, user equipment, another base station and the like). Specific implementations of the transceiver are not limited herein.

For example, in a case that the uplink transmission of the UE is capable of sharing the COT of the downlink transmission of the base station, the setting may include an indication of a length of the COT of the downlink transmission of the base station previous to the uplink transmission which the UE is capable of sharing. The indication may be, for example, information of the length of the COT or information of the LBT access priority class. It can be understood that the setting may further include an indication that the uplink transmission of the UE is capable of sharing the COT of the downlink transmission of the base station.

In addition, this setting causes the UE to dynamically reduce the duration of channel idle detection to perform uplink transmission based on channel idle detection with reduced latency. The channel idle detection may include, for example, the LBT. The setting may be used for determining the size of the contention window of the LBT.

The setting may include, for example, one or more of: an array serving as candidates of the size of the contention window of the LBT; the method of reducing the size of the contention window of the LBT and related parameters; a parameter for determining whether to reduce the size of the contention window of the LBT; and whether to dynamically reduce the size of the contention window of the LBT. Meanings of the items are described in detail in the second embodiment and thus are not repeated herein.

The providing unit 202 may, for example, include the setting in an RRC signaling to be provided to the UE.

With the electronic apparatus 200 according to this embodiment, the UE shares the COT of the downlink transmission of the base station without the need of performing the LBT for uplink transmission, and/or the UE dynamically reduces the size of the contention window of the LBT, to reduce the latency of the LBT, so as to reduce the latency of the BFR of the downlink on the unlicensed frequency band.

Fourth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 14:
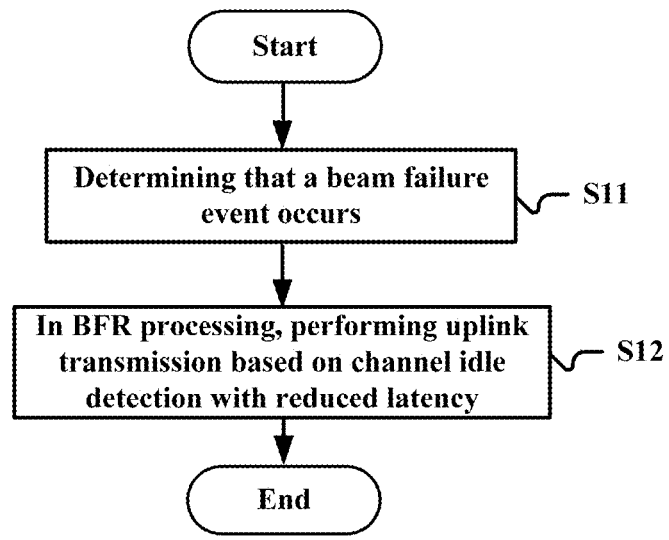
FIG. 14 is a flowchart of a method for wireless communications according to an embodiment of the present disclosure.

FIG. 14 is a flowchart of a method for wireless communications according to an embodiment of the present disclosure. The method includes: determining that a beam failure event of a downlink on an unlicensed frequency band occurs (S11); and in beam failure recovery processing with respect to the beam failure event, performing uplink transmission based on channel idle detection with reduced latency on the unlicensed frequency band (S12). The method, for example, may be performed on the UE side.

In an example, in step S12, the uplink transmission without the need of the channel idle detection may be performed by sharing COT of downlink transmission of a base station previous to the uplink transmission. For example, the uplink transmission includes transmitting a BFRQ to the base station, and the downlink transmission of the base station includes transmitting a BFRR to the UE. In addition, although not shown in the Figure, the method may further include acquiring, from the base station via an RRC signaling, an indication of a length of the COT of the downlink transmission which can be shared.

In another example, in step S12, the uplink transmission based on the channel idle detection with reduced latency may be performed by dynamically reducing duration of the channel idle detection. For example, the channel idle detection is LBT, and the size of the contention window of the LBT is dynamically determined in step S12. The size of the contention window of the LBT may be determined based on one or more of: the number of times of occurrence of the beam failure event, and historical conditions of the channel idle detection.

For example, in a case of determining that the historical idle degree of the channel meets a predetermined condition based on the historical conditions of the channel idle detection, the size of the contention window of the LBT is determined based on the number of times of occurrence of the beam failure event. Exemplarily, a corresponding value is determined from an array serving as candidates of the size of the contention window of the LBT as the size of the contention window of the LBT by taking the number of times of occurrence of the beam failure event as a sequence number. Alternatively, the initial value of the size of the contention window of the LBT can be attenuated with a predetermined rule based on the number of times of occurrence of the beam failure event, to determine the size of the contention window of the LBT. The attenuating, for example, may include exponential attenuating or multiple attenuating.

In addition, in step S12, the historical idle degree of the channel may be determined based on a ratio of the number of CCAs whose result indicating passing among L times of CCAs performed in the past and it is determined that the historical idle degree of the channel meets the predetermined condition in a case that the ratio exceeds a predetermined threshold. For example, the results of L times of CCAs include one or more of: results of CCAs periodically performed by the user equipment, and results of CCAs performed in the previous uplink transmissions. It is also possible to use only results of CCAs within a predetermined reference time range from the current time instant.

The method may further include acquiring, from the base station via an RRC signaling, an indication for determining the size of the contention window of the LBT. The indication, for example, may include one or more of: an array serving as candidates of the size of the contention window of the LBT; a method for reducing the size of the contention window of the LBT and related parameters; a parameter for determining whether to reduce the size of the contention window of the LBT; and whether to dynamically reduce the size of the contention window of LBT.

The method corresponds to the electronic apparatus 100 described in the first embodiment and the second embodiment. For details, one may refer to the above related description, and the details are not repeated herein.

Figure 15:
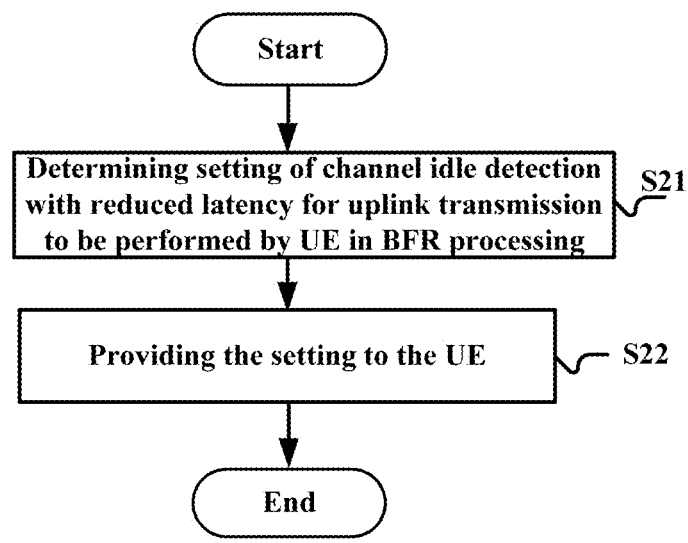
FIG. 15 is a flowchart of a method for wireless communications according to another embodiment of the present disclosure.

FIG. 15 is a flowchart of a method for wireless communications according to another embodiment of the present disclosure. The method includes: determining setting of channel idle detection with reduced latency for uplink transmission to be performed on an unlicensed frequency band by user equipment in beam failure recovery processing with respect to a beam failure event of downlink on the unlicensed frequency band (S21); and providing the setting to the user equipment (S22).

For example, the setting includes an indication of a length of the COT of the downlink transmission of the base station previous to the uplink transmission which the UE is capable of sharing.

In an example, with the setting, the UE dynamically reduces the duration of the channel idle detection to perform uplink transmission based on channel idle detection with reduced latency. The channel idle detection includes, for example, the LBT. The setting is used for determining the size of the contention window of the LBT. The setting may include one or more of: an array serving as candidates of the size of the contention window of the LBT; the method for reducing the size of the contention window of the LBT and related parameters; a parameter for determining whether to reduce the size of the contention window of the LBT; and whether to dynamically reduce the size of the contention window of the LBT.

In step S22, the setting may be included in an RRC signaling to be provided to the UE.

The method corresponds to the electronic apparatus 200 described in the third embodiment. For details, one may refer to the above related description, and the details are not repeated herein.

It should be noted that the above methods may be used separately or in combination.

The technology according to the present disclosure is applicable to various products.

For example, the electronic apparatus 200 may be implemented as various base stations. The base station may be implemented as any type of evolved node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote wireless head ends (RRH) located at positions different from the main body. In addition, various types of user equipment may each serves as a base station by performing functions of the base station temporarily or semi-permanently.

The electronic apparatus 100 may be implemented as various user equipments. The user equipment may be implemented as a mobile terminal (such as a smartphone, a tablet personal computer (PC), a notebook PC, a portable game terminal, a portable/dongle mobile router, and a digital camera) or a vehicle terminal (such as a vehicle navigation apparatus). The user equipment may also be implemented as a terminal that performs machine-to-machine (M2M) communication (also referred to as a machine type communication (MTC) terminal). Furthermore, the user equipment may be a wireless communication module (such as an integrated circuitry module including a single die) mounted on each of the terminals described above.

APPLICATION EXAMPLE REGARDING A BASE STATION

First Application Example

Figure 16:
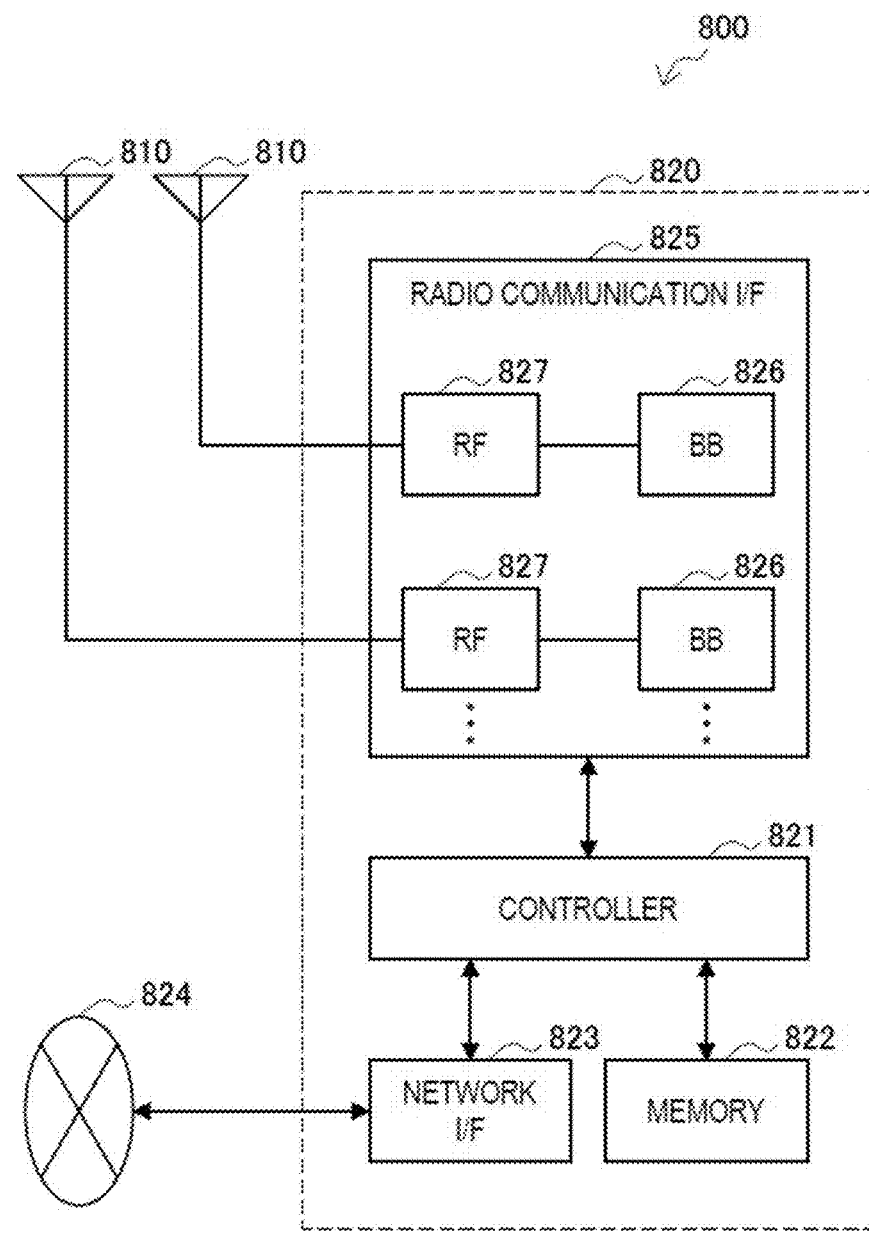
FIG. 16 is a block diagram showing a first example of an exemplary configuration of an eNB or gNB to which the technology according to the present disclosure may be applied.

FIG. 16 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 16, the eNB 800 may include the multiple antennas 810. For example, the multiple antennas 810 may be compatible with multiple frequency bands used by the eNB 800. Although FIG. 16 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 16, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 16. For example, the multiple RF circuits 827 may be compatible with multiple antenna elements. Although FIG. 16 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 16, a transceiver or the providing unit 202 of the electronic apparatus 200 may be implemented by the radio communication interface 825. At least a part of functions may also be implemented by the controller 821. For example, the controller 821 may reduce the latency of the BFR by reducing the latency of LBT of uplink transmission in BFR of downlink on the unlicensed frequency band, by performing functions of the determining unit 201 and the providing unit 202.

Second Application Example

Figure 17:
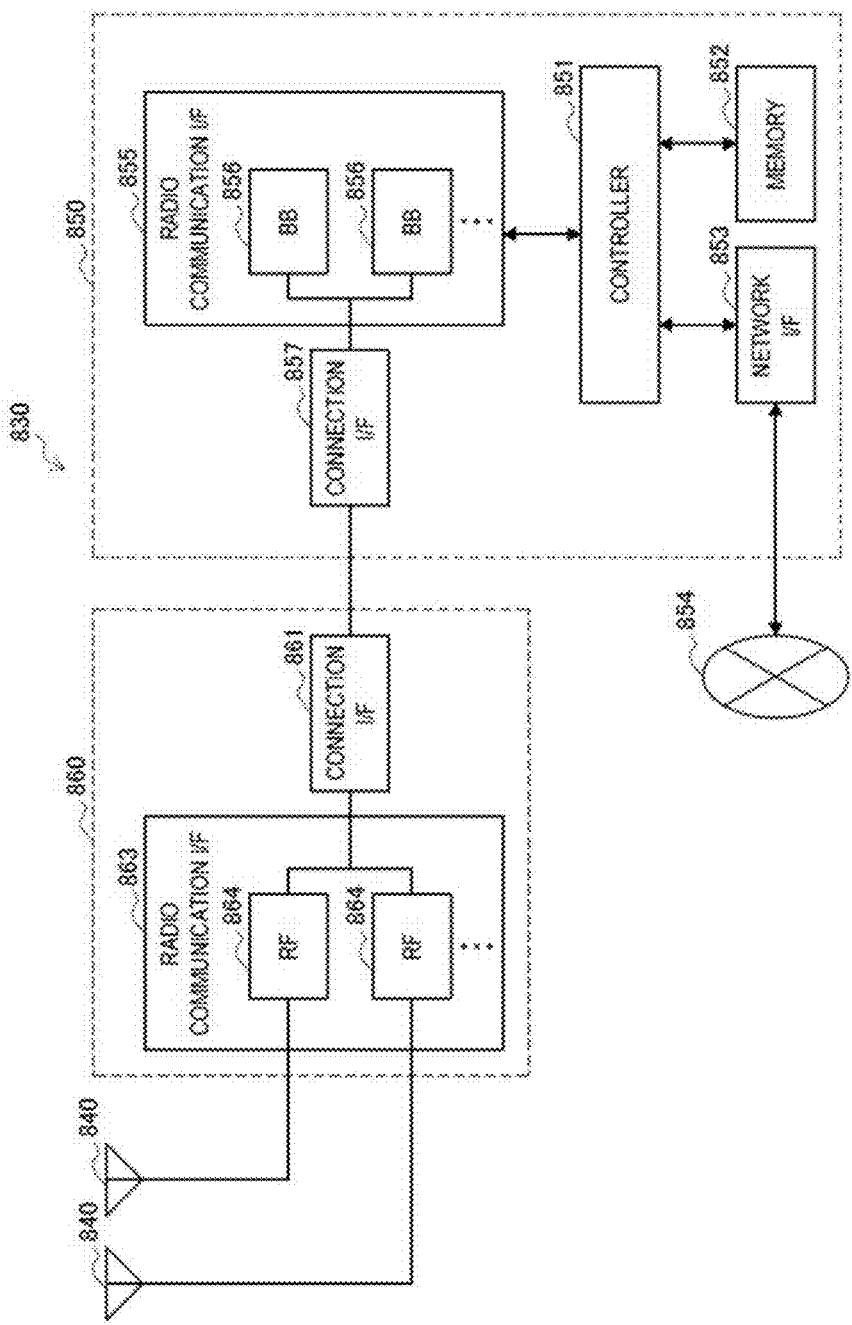
FIG. 17 is a block diagram showing a second example of an exemplary configuration of the eNB or gNB to which the technology according to the present disclosure may be applied.

FIG. 17 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 17, the eNB 830 may include the multiple antennas 840. For example, the multiple antennas 840 may be compatible with multiple frequency bands used by the eNB 830. Although FIG. 17 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 16.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 16, except that the BB processor 856 is connected to an RF circuit 864 of the RRH 860 via the connection interface 857. As show in FIG. 17, the radio communication interface 855 may include the multiple BB processors 856. For example, the multiple BB processors 856 may be compatible with multiple frequency bands used by the eNB 830. Although FIG. 17 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 17. For example, the multiple RF circuits 864 may support multiple antenna elements. Although FIG. 17 shows the example in which the radio communication interface 863 includes the multiple RF circuits 864, the radio communication interface 863 may also include a single RF circuit 864.

In the eNB 830 shown in FIG. 17, a transceiver or the providing unit 202 of the electronic apparatus 200 may be implemented by the radio communication interface 855 and/or the radio communication interface 863. At least a part of functions may also be implemented by the controller 851. For example, the controller 851 may reduce the latency of the BFR by reducing the latency of LBT of uplink transmission in BFR of downlink on the unlicensed frequency band, by performing functions of the determining unit 201 and the providing unit 202.

APPLICATION EXAMPLE REGARDING USER EQUIPMENT

First Application Example

Figure 18:
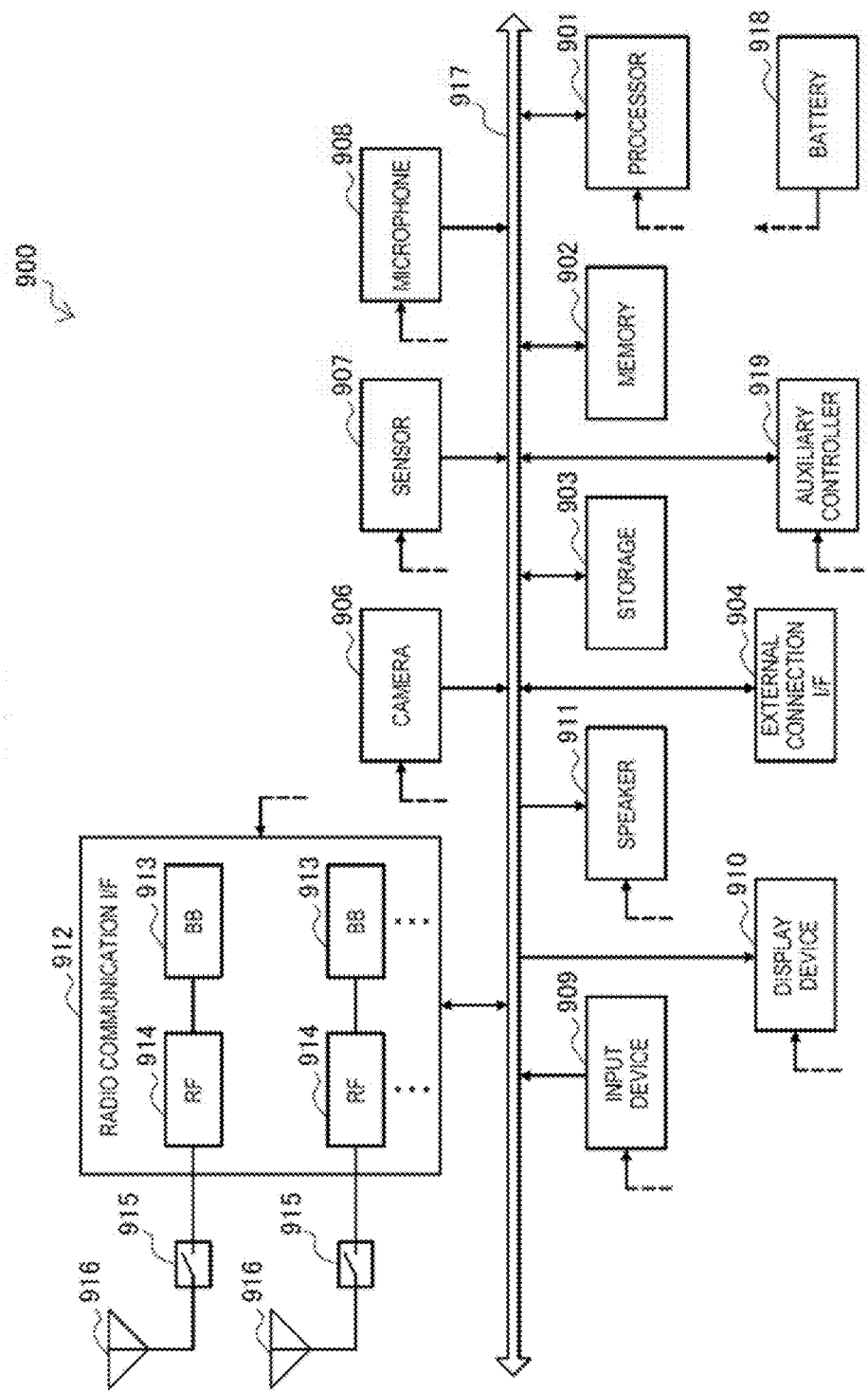
FIG. 18 is a block diagram showing an example of an exemplary configuration of a smartphone to which the technology according to the present disclosure may be applied.

FIG. 18 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 18 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 18. Although FIG. 18 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 18. Although FIG. 18 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 18 via feeder lines that are partially shown as dashed lines in FIG. 18. The auxiliary controller 919, operates a minimum necessary function of the smart phone 900, for example, in a sleep mode.

In the smartphone 900 shown in FIG. 18, a transceiver or the acquiring unit 103 of the electronic apparatus 100 may be implemented by the radio communication interface 912. At least a part of functions may also be implemented by the processor 901 or the auxiliary controller 919. For example, the processor 901 or the auxiliary controller 919 may reduce the latency of the BFR by reducing the latency of LBT of uplink transmission in BFR of downlink on the unlicensed frequency band, by performing functions of the determining unit 101, the performing unit 102 and the acquiring unit 103.

Second Application Example

Figure 19:
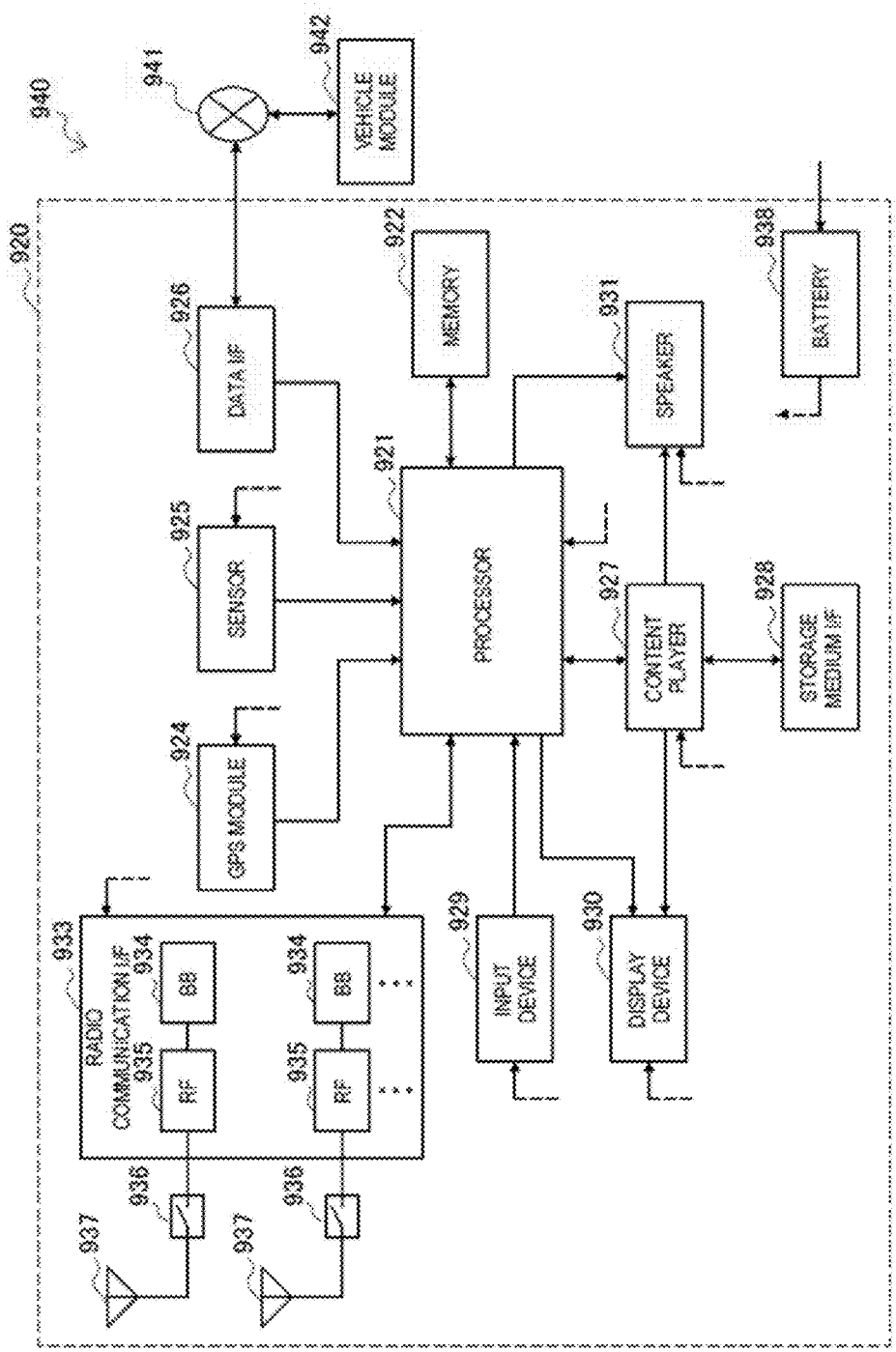
FIG. 19 is a block diagram showing an example of an exemplary configuration of a car navigation apparatus to which the technology according to the present disclosure may be applied.

FIG. 19 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 19. Although FIG. 19 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 19, the car navigation apparatus 920 may include the multiple antennas 937. Although FIG. 19 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 19 via feeder lines that are partially shown as dash lines in FIG. 19. The battery 938 accumulates power supplied from the vehicle.

In the car navigation apparatus 920 shown in FIG. 19, a transceiver or the acquiring unit 103 of the electronic apparatus 100 may be implemented by the radio communication interface 933. At least a part of the functions may also be implemented by the processor 921. For example, the processor 921 may reduce the latency of the BFR by reducing the latency of LBT of uplink transmission in BFR of downlink on the unlicensed frequency band, by performing functions of the determining unit 101, the performing unit 102 and the acquiring unit 103.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2000 shown in FIG. 20) from a storage medium or network, wherein the computer is capable of implementing various functions when installed with various programs.

Figure 20:
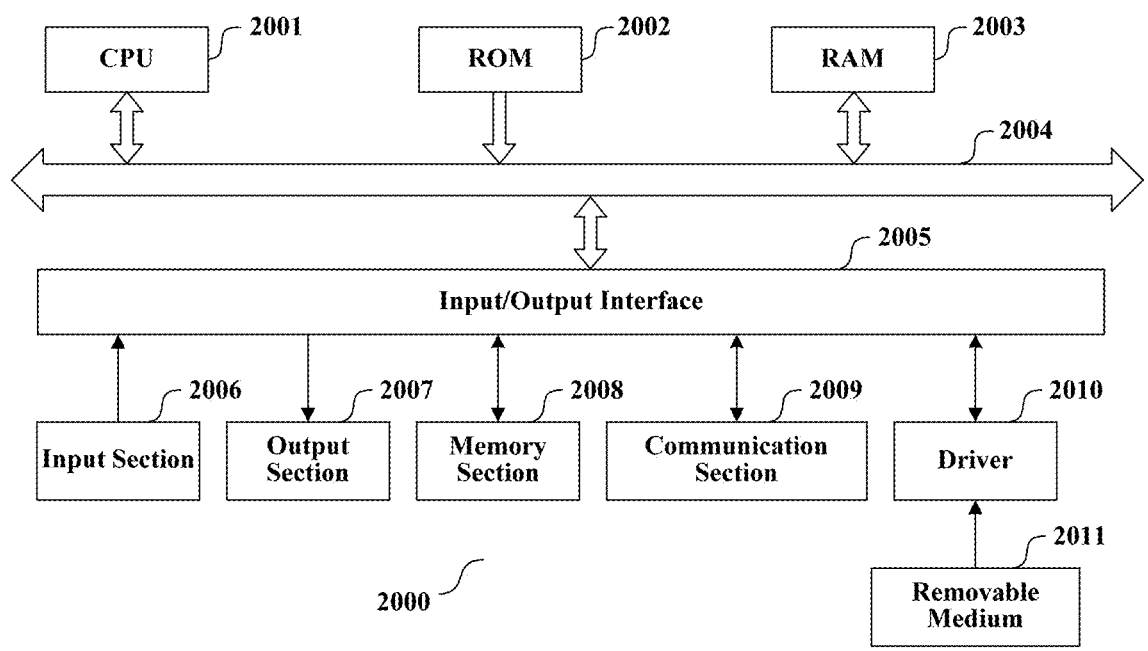
FIG. 20 is a block diagram of an exemplary block diagram illustrating the structure of a general purpose personal computer capable of realizing the method and/or device and/or system according to the embodiments of the present disclosure.

In FIG. 20, a central processing unit (CPU) 2001 executes various processing according to a program stored in a read-only memory (ROM) 2002 or a program loaded to a random access memory (RAM) 2003 from a memory section 2008. The data needed for the various processing of the CPU 2001 may be stored in the RAM 2003 as needed. The CPU 2001, the ROM 2002 and the RAM 2003 are linked with each other via a bus 2004. An input/output interface 2005 is also linked to the bus 2004.

The following components are linked to the input/output interface 2005: an input section 2006 (including keyboard, mouse and the like), an output section 2007 (including displays such as a cathode ray tube (CRT), a liquid crystal display (LCD), a loudspeaker and the like), a memory section 2008 (including hard disc and the like), and a communication section 2009 (including a network interface card such as a LAN card, modem and the like). The communication section 2009 performs communication processing via a network such as the Internet. A driver 2010 may also be linked to the input/output interface 2005, if needed. If needed, a removable medium 2011, for example, a magnetic disc, an optical disc, a magnetic optical disc, a semiconductor memory and the like, may be installed in the driver 2010, so that the computer program read therefrom is installed in the memory section 2008 as appropriate.

In the case where the foregoing series of processing is achieved through software, programs forming the software are installed from a network such as the Internet or a memory medium such as the removable medium 2011.

It should be appreciated by those skilled in the art that the memory medium is not limited to the removable medium 2011 shown in FIG. 20, which has program stored therein and is distributed separately from the apparatus so as to provide the programs to users. The removable medium 2011 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2002 and the memory section 2008 in which programs are stored, and can be distributed to users along with the device in which they are incorporated.

To be further noted, in the device, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, the electronic apparatus comprising:
   processing circuitry, configured to:
   determine that a beam failure event of downlink on an unlicensed frequency band occurs;
   in beam failure recovery processing with respect to the beam failure event, perform uplink transmission based on channel idle detection with reduced latency on the unlicensed frequency band by dynamically reducing a duration of the channel idle detection. wherein the channel idle detection is listen before talk (LBT); and
   dynamically determine a size of a contention window of the LBT based on one or more of a number of times of occurrence of the beam failure event and historical conditions of the channel idle detection.

2. The electronic apparatus according to claim 1, wherein the processing circuitry is configured to perform the uplink transmission without the channel idle detection by sharing channel occupancy time of a downlink transmission of a base station previous to the uplink transmission.

3. The electronic apparatus according to claim 2, wherein the uplink transmission comprises transmitting a beam failure recovery request to the base station, and the downlink transmission of the base station comprises transmitting a beam failure indication response to the user equipment.

4. The electronic apparatus according to claim 1, wherein the processing circuitry is further configured to determine the size of the contention window of the LBT based on the number of times of occurrence of the beam failure event, in a case of determining that a historical idle degree of a channel meets a predetermined condition based on the historical conditions of the channel idle detection.

5. The electronic apparatus according to claim 4,
   wherein the processing circuitry is configured to determine, by taking the number of times of occurrence of the beam failure event as a sequence number, a corresponding value from an array serving as candidates of the size of the contention window of the LBT as the size of the contention window of the LBT; or
   wherein the processing circuitry is configured to attenuate an initial value of the size of the contention window of the LBT with a predetermined rule based on the number of times of occurrence of the beam failure event, to determine the size of the contention window of the LBT.

6. The electronic apparatus according to claim 5, wherein the attenuating comprises exponential attenuating or multiple attenuating.

7. The electronic apparatus according to claim 4, wherein the processing circuitry is configured to determine the historical idle degree of the channel based on a ratio of a number of clear channel assessments (CCAs) whose result indicating passing among L times of CCAs previously performed, and determine that the historical idle degree of the channel meets the predetermined condition in a case that the ratio exceeds a predetermined threshold.

8. The electronic apparatus according to claim 7, wherein the results of the number of CCAs comprise one or more of: results of CCAs periodically performed by the user equipment, and results of CCAs performed in previous uplink transmission.

9. The electronic apparatus according to claim 7, wherein the processing circuitry is further configured to use a result of a CCA within a predetermined reference time range from a current time instant.

10. The electronic apparatus according to claim 1, wherein the processing circuitry is further configured to acquire, from a base station, an indication for determining the size of the contention window of the LBT via a radio resource control signaling.

11. The electronic apparatus according to claim 10, wherein the indication comprises one or more of:
   an array of candidates serving as the size of the contention window of the LBT;
   a method for reducing the size of the contention window of the LBT and related parameters;
   a parameter for determining whether to reduce the size of the contention window of the LBT; and
   whether to dynamically reduce the size of the contention window of the LBT.

12. The electronic apparatus according to claim 2, wherein the processing circuitry is configured to acquire, from the base station, an indication of a length of channel occupancy time of downlink transmission that can be shared via a radio resource control signaling.

13. An electronic apparatus for wireless communications, the electronic apparatus comprising:
   processing circuitry, configured to:
      determine a setting of channel idle detection with reduced latency for uplink transmission to be performed on an unlicensed frequency band by a user equipment in beam failure recovery processing with respect to a beam failure event of downlink on the unlicensed frequency band; and
      provide the setting to the user equipment, wherein according to the setting, the user equipment:
      performs, in the beam failure recovery processing with respect to the beam failure event, uplink transmission based on the channel idle detection with reduced latency on the unlicensed frequency band by dynamically reducing a duration of the channel idle detection. wherein the channel idle detection is listen before talk (LBT); and
      dynamically determines a size of a contention window of the LBT based on one or more of a number of times of occurrence of the beam failure event and historical conditions of the channel idle detection.

14. The electronic apparatus according to claim 13, wherein the processing circuitry is configured to comprise the setting in a radio resource control signaling to be provided to the user equipment.

15. The electronic apparatus according to claim 13, wherein the setting comprises an indication of a length of channel occupancy time of downlink transmission of a base station previous to the uplink transmission which the user equipment is capable of sharing.

16. A method for wireless communications, the method comprising:
   determining that a beam failure event of downlink on an unlicensed frequency band occurs;
   in beam failure recovery processing with respect to the beam failure event, performing uplink transmission based on channel idle detection with reduced latency on the unlicensed frequency band by dynamically reducing a duration of the channel idle detection, wherein the channel idle detection is listen before talk (LBT); and
   dynamically determining a size of a contention window of the LBT based on one or more of a number of times of occurrence of the beam failure event and historical conditions of the channel idle detection.

17. The method according to claim 16, further comprising performing the uplink transmission without the channel idle detection by sharing channel occupancy time of a downlink transmission of a base station previous to the uplink transmission.

18. The method according to claim 17, wherein the uplink transmission comprises transmitting a beam failure recovery request to the base station, and the downlink transmission of the base station comprises transmitting a beam failure indication response.

19. The method according to claim 16, further comprising determining the size of the contention window of the LBT based on the number of times of occurrence of the beam failure event, in a case of determining that a historical idle degree of a channel meets a predetermined condition based on the historical conditions of the channel idle detection.

20. The method according to claim 19, further comprising:
   determining, by taking the number of times of occurrence of the beam failure event as a sequence number, a corresponding value from an array serving as candidates of the size of the contention window of the LBT as the size of the contention window of the LBT; or
   attenuating an initial value of the size of the contention window of the LBT with a predetermined rule based on the number of times of occurrence of the beam failure event, to determine the size of the contention window of the LBT.

* * * * *